United States Patent
Pien

(10) Patent No.: US 8,800,245 B1
(45) Date of Patent: Aug. 12, 2014

(54) METHOD AND APPARATUS FOR FLOOR TILES AND PLANKS

(71) Applicant: Chao Kang Pien, Edison, NJ (US)

(72) Inventor: Chao Kang Pien, Edison, NJ (US)

(73) Assignee: Advanceed Vinyl Floor Manufacturing Corp., Edison, NJ (US)

( * ) Notice: Subject to any disclaimer, the term of this patent is extended or adjusted under 35 U.S.C. 154(b) by 23 days.

(21) Appl. No.: 13/851,635

(22) Filed: Mar. 27, 2013

(51) Int. Cl.
  *E04F 15/02* (2006.01)
  *B32B 3/26* (2006.01)
  *B32B 3/12* (2006.01)
  *E04F 15/10* (2006.01)

(52) U.S. Cl.
  CPC ........... *E04F 15/02044* (2013.01); *B32B 3/263* (2013.01); *B32B 3/12* (2013.01); *E04F 15/02172* (2013.01); *E04F 15/02155* (2013.01); *E04F 15/107* (2013.01)
  USPC ........ 52/747.11; 52/390; 52/783.1; 52/789.1; 52/796.1; 428/411.1

(58) Field of Classification Search
  CPC ..... E04F 15/102; E04F 15/105; E04F 15/107; E04F 15/0215; E04F 15/02155; E04F 15/02172; E04F 15/02044; D06N 1/00
  USPC .......... 52/747.1, 747.11, 783.1, 789.1, 796.1; 442/101
  See application file for complete search history.

(56) References Cited

U.S. PATENT DOCUMENTS

| | | | |
|---|---|---|---|
| 3,616,139 A | 10/1971 | Jones | 428/118 |
| 4,180,615 A | 12/1979 | Bettoli | 428/339 |
| 4,195,107 A | 3/1980 | Timm | 428/40.6 |
| 4,301,890 A | 11/1981 | Zalas | 181/286 |
| 4,348,477 A | 9/1982 | Nakano | 435/91.41 |
| 4,439,480 A | 3/1984 | Sachs | 428/161 |
| 4,547,245 A * | 10/1985 | Colyer | 156/220 |
| 4,553,631 A | 11/1985 | Panza | 181/291 |
| 4,557,961 A | 12/1985 | Gorges | 428/117 |
| 4,990,188 A | 2/1991 | Micek | 106/36 |
| 5,037,498 A | 8/1991 | Umeda | 156/307.3 |
| 5,445,861 A | 8/1995 | Newton | 428/116 |
| 5,460,865 A | 10/1995 | Tsotsis | 428/116 |
| 5,653,836 A | 8/1997 | Mnich | 156/98 |
| 6,022,617 A * | 2/2000 | Calkins | 428/354 |
| 6,179,086 B1 | 1/2001 | Bansemir | 181/292 |
| 6,180,206 B1 | 1/2001 | Kain, Jr. | 428/116 |
| 6,182,787 B1 | 2/2001 | Kraft | 181/292 |
| 6,253,655 B1 | 7/2001 | Lyons | 89/36.02 |
| 6,319,349 B1 | 11/2001 | Lin | 156/209 |
| 6,440,257 B1 | 8/2002 | Zhou | 156/307.3 |
| 6,607,831 B2 | 8/2003 | Ho | 428/423.1 |
| 6,667,089 B1 | 12/2003 | Barker | 428/73 |
| 7,419,031 B2 | 9/2008 | Liguore | 181/210 |
| 8,070,994 B2 | 12/2011 | Carlson | 264/46.5 |

(Continued)

*Primary Examiner* — Robert Canfield
(74) *Attorney, Agent, or Firm* — Walter J. Tencza, Jr.

(57) ABSTRACT

A piece for flooring which includes a wear layer, a pattern layer, a base layer, and a backing layer. The base layer may be made of a mixture including ilmenite powder. About one third of the mixture may be ilmenite powder. The mixture may also include calcium carbonate, wherein about one quarter of the mixture is calcium carbonate. The mixture may further include polyvinylchloride, wherein about one quarter of the mixture is polyvinylchloride. The backing layer may include a plurality of devices which are hexagonally shaped, wherein the plurality of devices form a honeycomb structure which contacts a top floor surface when the piece is placed on the top floor surface. The backing layer may have a bottom surface including anti-slip backing film, which may be comprised of polyurethane.

19 Claims, 4 Drawing Sheets

(56) References Cited

U.S. PATENT DOCUMENTS

| | | | |
|---|---|---|---|
| 8,156,710 B1 | 4/2012 | Pien .................... 52/788.1 |
| 8,394,217 B2* | 3/2013 | Pien ........................ 156/71 |
| 2003/0040598 A1 | 2/2003 | Wang ...................... 528/129 |
| 2003/0154662 A1* | 8/2003 | Bruchu et al. ............... 52/87 |
| 2003/0167710 A1 | 9/2003 | Tanase ..................... 52/220.1 |
| 2004/0211130 A1* | 10/2004 | Horstman et al. ........... 52/177 |
| 2005/0000186 A1 | 1/2005 | Van Erp |
| 2005/0108968 A1 | 5/2005 | Forster ....................... 52/578 |
| 2005/0194210 A1 | 9/2005 | Panossian .................. 181/293 |
| 2006/0000186 A1 | 1/2006 | Carlson ..................... 52/793.1 |
| 2006/0008611 A1 | 1/2006 | Shen ........................... 428/73 |
| 2006/0138279 A1 | 6/2006 | Pisarski .................... 244/118.5 |
| 2006/0156663 A1 | 7/2006 | Mao ......................... 52/403.1 |
| 2007/0054087 A1 | 3/2007 | Smith ........................ 428/116 |
| 2007/0101679 A1 | 5/2007 | Harthcock ................. 52/782.1 |
| 2007/0102239 A1 | 5/2007 | Liguore ..................... 181/292 |
| 2007/0134466 A1 | 6/2007 | Rajaram .................... 428/116 |
| 2007/0193149 A1* | 8/2007 | Chang ....................... 52/302.1 |
| 2007/0204556 A1 | 9/2007 | Pacione ................... 52/745.21 |
| 2009/0223154 A1* | 9/2009 | Anderson ................. 52/309.1 |
| 2010/0239816 A1* | 9/2010 | Kinkade ..................... 428/142 |
| 2012/0167522 A1* | 7/2012 | Pien ........................ 52/745.13 |
| 2013/0029115 A1* | 1/2013 | Chen ......................... 428/201 |
| 2013/0230687 A1* | 9/2013 | Chen ......................... 428/116 |

* cited by examiner

METHOD AND APPARATUS FOR FLOOR TILES AND PLANKS

FIELD OF THE INVENTION

The present invention relates to floor planks and tiles and particularly resilient floor tiles and planks, such as for example, vinyl tiles and planks, rubber tiles and planks, and other synthetic plastic floor tiles and planks. The present invention also relates to sheet vinyl and sheet rubber.

BACKGROUND OF THE INVENTION

There are various devices known in the prior art concerning floor tiles and planks. One or more prior art techniques concerning floor planks are shown in U.S. Pat. No. 4,195,107 to Timm, U.S. Pat. No. 4,180,615 to Bettoli, U.S. Pat. No. 4,348,477 to Miller, U.S. Pat. No. 4,990,188 to Micek, U.S. Pat. No. 4,439,480 to Sachs, and U.S. Published Patent Application no. US 2006/0156663 to Chen-chi Mao, which are incorporated by reference herein.

Known polyvinyl chloride (PVC) floor planks and tiles (so-called vinyl floor in U.S., or PVC floor in Europe, Australia and some other Asian and African countries) employ specialized adhesives (such as "pressure sensitive" adhesives) for affixing the floor planks or tiles to a subfloor, subfloor surface, or underlayment. Two major methods are used for applying adhesives for so called PVC or vinyl floors. In the first method, adhesive is manually applied onto the surface of subflooring or underlayment, and then the vinyl floor is manually applied to the adhesive-coated surface of subflooring or underlayment. In the second method an adhesive-backed vinyl floor plank or tile is provided, in which the adhesive is already applied over the back of vinyl floor or floor plank or tile, without the need of preparing an adhesive-coated surface on top of the subflooring or underlayment. However, typically for the second method, a flooring primer may need to be applied on top of the surface of the subflooring or underlayment, depending on the condition of the subfloor or underlayment. The second known method helps to provide a substantial saving in labor and time by simply allowing removal of a backing, such as a piece of paper or plastic film coated with releasing substance such as polyurethane, silicone, or acrylic, to expose a protected adhesive material on the back of a floor plank or tile.

However, the two aforementioned known methods of floor plank or tile installation do not provide satisfactory performance due to some significant problems. Firstly, for either method, the job of planning installation of a new floor, including many floor planks or tiles, can be confusing. It may be difficult to properly position and balance the overall vinyl floor (comprised of many floor planks or tiles) in a room. Before laying the floor planks or tiles down, measuring and centering the underlayment may be formidable. Any mistake made at a beginning stage may require removal, replacement, repair, or even entire re-installation of all of the floor planks or tiles.

Secondly, for a renewal or replacement installation, i.e. for a replacement of an existing vinyl floor with a new vinyl floor, a complete cycle for the renewal or replacement installation can be relatively long because among other reasons, removal and replacement are somewhat challenging. Sometimes, the removability of a fully adhered vinyl floor (including a plurality of floor planks or tiles) comes up with great difficulty. Furthermore, repair can be arduous, too. Repair usually involves removing existing or damaged vinyl floor planks or tiles or even an entire floor comprised of many floor planks or tiles. Repair may also involve scraping and patching the subflooring, and remedying, such as leveling and repairing, the underlayment, and re-spreading adhesive on top of the repaired or remedied subflooring.

Thirdly, diverse varieties of subflooring and underlayment with distinct qualities and conditions need to be cautiously evaluated during the preparation of installation of a vinyl flooring, including contents of moisture, smoothness of surface, leveling of ground, cleanness of surface, rating of alkali and other factors. Most of pre-installation tests can exclusively be accomplished by professional contract installers, manufacturers or laboratories.

Fourthly, the particular subflooring or underlayment onto which the vinyl floor planks or tiles must be laid may be comprised of any one of a wide variety of materials such as concrete, gypsum, plywood, and existing floorings such as vinyl, ceramic, hardwood, and laminate. Each one of these different subflooring or underlayment materials typically has different features and properties, and the adhesive applied to the subflooring must take into account these different features and properties. For example, a different adhesive may need to be applied to a concrete subflooring versus a plywood subflooring, or the adhesive may need to be applied in a different manner depending on the subflooring material Fifthly, the brands, qualities and types of adhesive, particularly the contents, ingredients and physical properties, may influence or even impact the performance of installation of PVC or vinyl floor planks or tiles. Therefore, installers, whoever are professional contractors or amateur consumers need to spend additional time to research and study different types of adhesives, or may also need technical support from manufacturers, manufacturer's representatives or manufacturer's distributors.

Sixthly, some types of adhesive may fail to maintain adequate cohesion strength because of the problem of plasticizer migration into adhesive. Plasticizer typically exists in the base layer of vinyl floors, or may exist in some resilient type of underlayment or subflooring. Storage conditions and storage period of adhesives may also impact how the adhesives adhere to a surface.

Seventhly, excessive use of adhesives may cause "ooze", which means adhesive coming out from seams or joints between floor tiles or planks. This "ooze" causes an undesirable visual appearance on the flooring and/or in the waste of labor and time to get rid of and clean up.

Eighthly, deficit or unevenness of spreading adhesive may cause installation failure due to loose pieces from subflooring or underlayment.

In addition to the difficulties of implementing installation satisfactorily, as mentioned above, another disadvantage is that the application of adhesive produces essentially permanent structures that are difficult to alter, repair or remove once a vinyl floor, including a plurality of vinyl planks or tiles, has been installed. There are various hardware tools and chemicals for removing adhesive-installed vinyl floors, however, it is very difficult, if not impossible to completely eliminate adhesive residue from a subflooring or underlayment, or to completely restore a subflooring to an original intact condition.

Traditionally, adhesive is absolutely required to achieve the installation of vinyl floor. However, before, during and after the use of adhesive all may have inconveniences, concerns and problems to both household amateur consumers and professional contract installers.

An anti-slip film, such as made of polyurethane, is disclosed in U.S. Pat. No. 8,156,710, to Chang Kao Pien (also the applicant for the present invention), incorporated in its entirety by reference herein. (U.S. Pat. No. 8,156,710, col. 8, lns. 39-45). The anti-slip film disclosed in U.S. Pat. No. 8,156,710 to Pien (Pien '710), generally helps to keep floor planks or floor tiles from moving to a certain extent. But that anti-slip film is not sufficiently sticky or tacky, and the floor plank or tile 1 provided in Pien '710 overwhelmingly counts on the weight of the tile or floor plank to help prevent the tile or floor plank from sliding after being laid on a floor surface. Therefore, the tile or floor plank 1 in Pien '710 typically needs to be thick, and the heavy-weight filler of the base layer 6 is used to make the tile or floor plank 1 in Pien '710 heavy enough so that the floor plank 1 doesn't slide substantially after being laid on a floor surface. Generally, this thicker tile or floor plank 1 in Pien '710 means a higher cost.

SUMMARY OF THE INVENTION

In at least one embodiment of the present invention an apparatus is provided which includes a piece for flooring. The piece for flooring may be a floor plank or floor tile. The piece for flooring may be comprised of a wear layer, a pattern layer, a base layer, and a backing layer. The base layer may be made of a mixture comprised of ilmenite powder. About one third of the mixture may be ilmenite powder. The mixture may also be comprised of calcium carbonate. The mixture may be comprised of calcium carbonate, wherein about one quarter of the mixture is calcium carbonate. The mixture may be further comprised of polyvinylchloride, wherein about one quarter of the mixture is polyvinylchloride. The backing layer may include a plurality of devices which are hexagonally shaped, and wherein the plurality of devices form a honeycomb structure which contacts a top floor surface when the piece is placed on the top floor surface. The backing layer may have a bottom surface including anti-slip backing film, which frictionally engages the material or structure lying beneath the bottom surface of the floor to keep the floor in place with respect to the material or structure lying beneath the floor. The anti-slip backing film may be or may be replaced by an anti-slip backing coating made of a water based synthetic material including water, dipropylene glycol, polypropylene homopolymer, and n-butyly ether.

An anti-slip backing coating provided by the present application (such as made of water dipropylene glycol, polypropylene homopolymer, and n-butyl ether in a composition A which will be described), in one or more embodiments, is much tackier or stickier than for example the anti-slip film, such as polyurethane, referred in Pien '710 at col. 8, lns. 39-45. Although the anti-slip backing coating of the present application, in one or more embodiments, is not the same as adhesive, the anti-slip backing coating of the present application, in one or more embodiments, can help a floor plank or floor tile stay even without a large amount of weight being used for the floor plank or tile. Floor plank or tile thickness can be reduced from four millimeters (4.0 mm) (0.16 inch gauge) to 3.2 millimeters (mm) (⅛ inch gauge) or 2.5 m/m (0.10 inch gauge) or even thinner resulting in significant cost savings.

In addition, thicker floor planks or floor tiles may cause extra work for installation. For example, when connecting thicker floor planks or tiles with other flooring with thinner thicknesses there may be a need to add an extra transition piece to fit the different sized flooring together or may be a need to cut an edge of a door bottom to keep appropriate space.

In addition, the anti-slip film of Pien '710, such as polyurethane is not sufficiently tacky or sticky, such that when a person accidentally kick or pivots in a manner which pushes on the side of a floor plank or floor tile, the floor plank or floor tile may pop up and cause some pieces of floor tiles or floor planks to be dislocated. This is possible, at least in part, because not all subfloors or underlayments are perfectly flat and leveling. In one or more embodiments of the present application, an anti-slip backing coating, such as of the composition A, described below, is sufficiently sticky or tacky to substantially prevent dislocation of floor planks to a much greater extent than the prior anti-slip film of Pien '710.

The anti-slip backing coating of the composition A, in at least one embodiment, is preferably a water based synthetic material having about 35% to 42% water, about 8% to 10% dipropylene glycol, about 40% to 50% polypropylene homopolymer, and about 6% to 8% n-butyl ether by weight. In at least one embodiment, these proportions are critical.

In at least one embodiment, polypropylene homopolymer is the core of this coating, it creates the function of tacky and anti-slip; water, dipropylene glycol and n-butyl ether form a "solvent system" that dissolves polypropylene homopolymer. The purpose, in at least one embodiment, is to keep the polypropylene homopolymer in the liquid until someone paints, spreads or sprays it on a surface. When that happens, the solvent ingredients will slowly evaporate, leaving the homopolymer as the main functional material on the surface.

A change in percentages of the components of composition A above, won't completely alter the performance of this anti-slip coating, but may influence the convenience of application, prolong the time of curing (drying) and increase the unit cost. Less contents of solvent system or solvent combination of components (which may include water, dipropylene glycol, and n-butyl ether) will make coating thicker; therefore, a higher temperature may be needed to cure or spend more time may be needed to cure, and the use of anti-slip coating (grams per square feet) would typically be higher and thus more expensive.

Polypropylene homopolymer (PPH) is an economical and environmentally-friendly material that offers a combination of outstanding physical, mechanical, thermal, and electrical properties not found in any other thermoplastic. It has a lower impact strength, but superior working temperature and tensile strength. Polypropylene provides very good resistance to organic solvents, degreasing agents and electrolytic attack. It is light in weight, resistant to staining and has a low moisture absorption rate. Polypropylene is widely utilized, it offers a high strength to weight ration and is stiffer and stronger than copolymer. This combined with good chemical resistance.

N-butyl ether is a crystal clear and organic liquid usually added to resin or polymer formulations as well as a diluent (are used as a chemical intermediate to make other compounds), to reduce viscosity, favoring improved filler loading and substrate wetting and resulting in faster curing time and to ease flow movement or to improve the consistency and applicability. In addition to coating, typical applications would also be for the manufacture of paints, lacquer, varnishes and adhesives.

The major function of N-butyl ether is to make the application of this anti-slip coating simplified by decreasing the viscosity of coating especially at low temperature, and it must be evaporated during or after application. The term of diluent is also used in solvent system as an inert substance added to some other substance or solution so that the concentration volume is decreased Dipropylene glycol is a colourless, viscous, practically non-toxic and slightly hygroscopic liquid. Dipropylene glycol is miscible in water, alcohols, esters and almost all organic solvents. In the anti-slip coating of at least one embodiment of the present invention, such as of a composition A, dipropylene glycol is used as a solvent, as well as an ingredient of a functional fluid, a lubricant and an anti-freezing agent. Its low toxicity and solvent properties make it an ideal additive for this coating.

Polypropylene homopolymer, dipropylene glycol may also be used as a plasticizer, an intermediate, as a polymerization initiator or monomer, and as a solvent.

At least one embodiment of the present application may include a method which may be comprised of placing a plurality of pieces for flooring on a subfloor to form a floor, wherein each of the plurality of pieces is comprised of a wear layer, a pattern layer, a base layer, and a backing layer; and wherein the base layer is made of a mixture comprised of ilmenite powder. Each of the plurality of pieces may be placed on the subfloor without applying an adhesive to adhere the plurality of pieces to the subfloor. Each of the plurality of pieces may have a structure or a composition as previously described.

At least one embodiment of the present invention provides a method and apparatus for installing floor planks or tiles. In at least one embodiment of the present invention, floor planks or tiles are installed without applying an adhesive to adhere the floor planks to a subflooring.

A principle object of one or more embodiments of the present invention is an improved technique in installing flooring, such as installing vinyl flooring, including floor tiles and planks. A floor plank or tile in accordance with an embodiment of the present invention may include an additional layer or supplemental coating, such as an anti-slip layer, on the back of the floor plank or tile. In addition, in at least one embodiment, the anti-slip layer may be replaced by or supplemented with an additional layer or supplemental coating of a composition A to be described.

It is another object of one or more embodiments of the present invention to provide a unique technique for attaching floor planks or tiles, such as vinyl floor planks or other resilient floor planks or tiles to subfloors, underlayments, or equivalent substrates.

It is another object of one or more embodiments of the present invention to provide floor planks or tiles which are configured to be attached to structural sub surfaces with a minimum of skill, effort and cost.

It is a further object of one or more embodiments of the present invention to provide a method and/or apparatus for floor planks or tiles, which allow floor planks or tiles to be fixed to structural sub surfaces without shifting over time, due to use, outdoor weather, indoor temperature changes, foot traffic pivoting, furniture movement, and/or expansion/contraction based on the natural features (physical properties) of tile itself.

It is a further object of one or more embodiments of the present invention to provide a non-movable, anti-slip layer or film laminated underneath a vinyl floor or equivalent resilient floor covering which is durable, non-deteriorating and not subject to blistering or bubbling from the effect of moisture or chemicals.

One or more embodiments of the present invention provide a non-skid substance coated over the surface of floor plank's or tile's backing layer. The non-skid substance may be durable, non-deteriorating and not subject to blistering or bubbling from the effect of moisture and chemicals.

One or more embodiments of the present invention may provide an abradant particle or particles such as carborundum, emery, corundum, asphalt, pitch, or bitumen embedded over the backing layer of a floor plank. The abradant particle, particles, or material may be durable, non-deteriorating and not subject to blistering or bubbling from the effect of moisture and chemicals. One or more embodiments of the present invention may provide anti-slip emboss or texture on the backing layer of a floor plank, such as a resilient floor plank, which is durable, non-deteriorating and subject to strengthen the immovability of floor tiles or planks, when they are installed on a subfloor surface.

In at least one embodiment, an anti-slip backing coating of the composition A may be located on the bottom surface or backing layer of a floor plank. The anti-slip backing coating of the composition A, in at least one embodiment, is preferably a water based synthetic material having about 35% to 42% water, about 8% to 10% dipropylene glycol, about 40% to 50% polypropylene homopolymer, and about 6% to 8% n-butyly ether by weight. In at least one embodiment, the aforementioned proportions or substantially similar is critical to provide a satisfactory anti-slip backing coating.

One or more embodiments of the present invention may provide a certain amount of a heavy weight substance added into a base layer as a filler for a resilient floor plank or tile. The heavy weight substance may enhance the immovability of tiles or planks.

Other objects or further scopes of applicability of one or more embodiments of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

At least one embodiment of the present invention provides a method comprising the steps of putting together a first piece, wherein the first piece is comprised of a protective wear layer, a pattern layer, a resilient synthetic base layer, and a non-movable, anti-slip backing layer; with the wear layer, the pattern layer, base layer and backing layer, arranged in a sandwich manner, such that the wear layer is on top of the pattern layer, the pattern layer is on top of the base layer, the base layer is on the backing layer, and the pattern layer and base layer are between the wear layer and the backing layer.

In at least one embodiment, the method includes applying numerous embossed or textured cupules or devices (by press through heat or by engraving) on the backing layer. The devices or cupules on the backing layer may be arranged like regular hexagon honeycomb or beehive, but other patterns for the devices may be provided such as honeycomb, diamond, square, triangle and other patterns such as from a treadplate. The height of regular hexagon honeycomb may be about 0.1 millimeters to 0.3 millimeters. The distance between each two horizontal sides of adjacent devices or cupules may be three millimeters (mm) to five millimeters (mm). For a better performance, above mentioned height and horizontal distance of hexagon honeycomb can be adjusted.

In at least one embodiment, a method may further include applying a PVC non-movable anti-slip film or polyurethane non-movable, anti-slip film, or other substances with similar function, such as anti-slip textile, coating of aluminum oxide infused polyurethane (PU), Epoxy resin, acrylic, Teflon (polytetrafluoroethylene), or rubber/silicone synthetics.

In at least one embodiment, a method may further include applying powdered ilmenite, or titanium powder, to a synthetic mixture of polyvinyl chloride powder, Calcium Carbonate and other additives for producing the base layer of floor plank or tile, such as a resilient floor plank or tile, such as a vinyl floor plank or tile.

DETAILED DESCRIPTION OF THE DRAWINGS

Figure 1A:
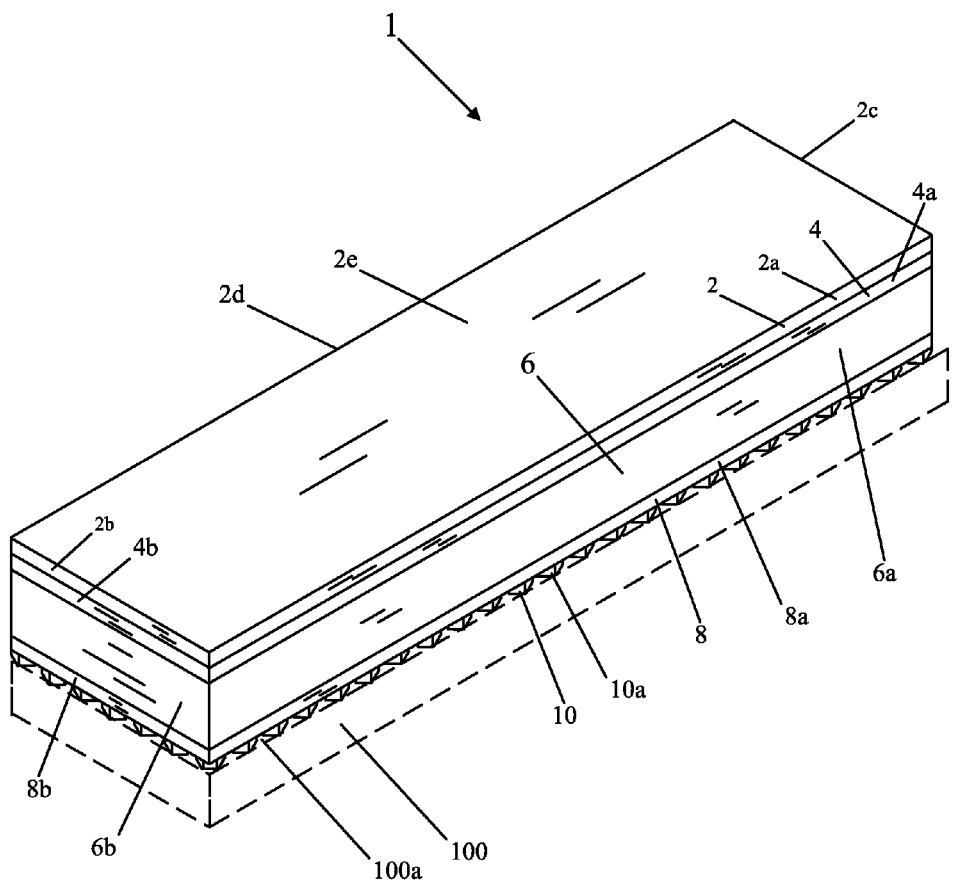
FIG. 1A shows a top, front, right side perspective view of a floor plank or tile in accordance with an embodiment of the present invention.
Figure 1B:
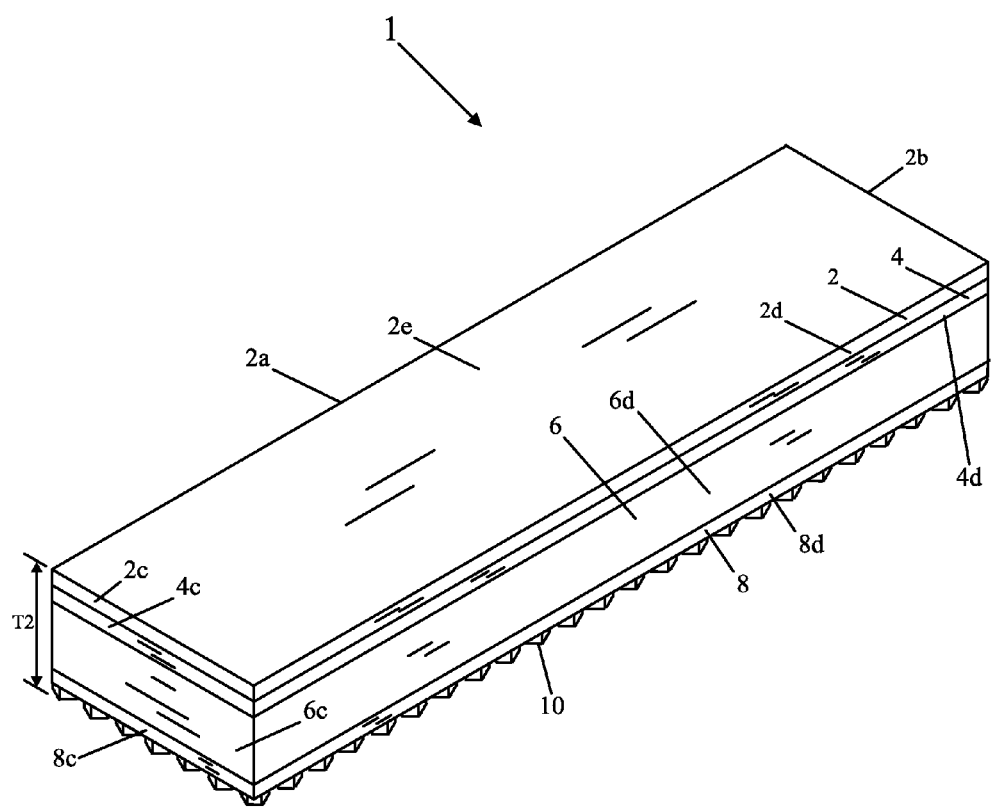
FIG. 1B shows a top, rear, left side perspective view of the floor plank or tile of FIG. 1A.
Figure 1C:
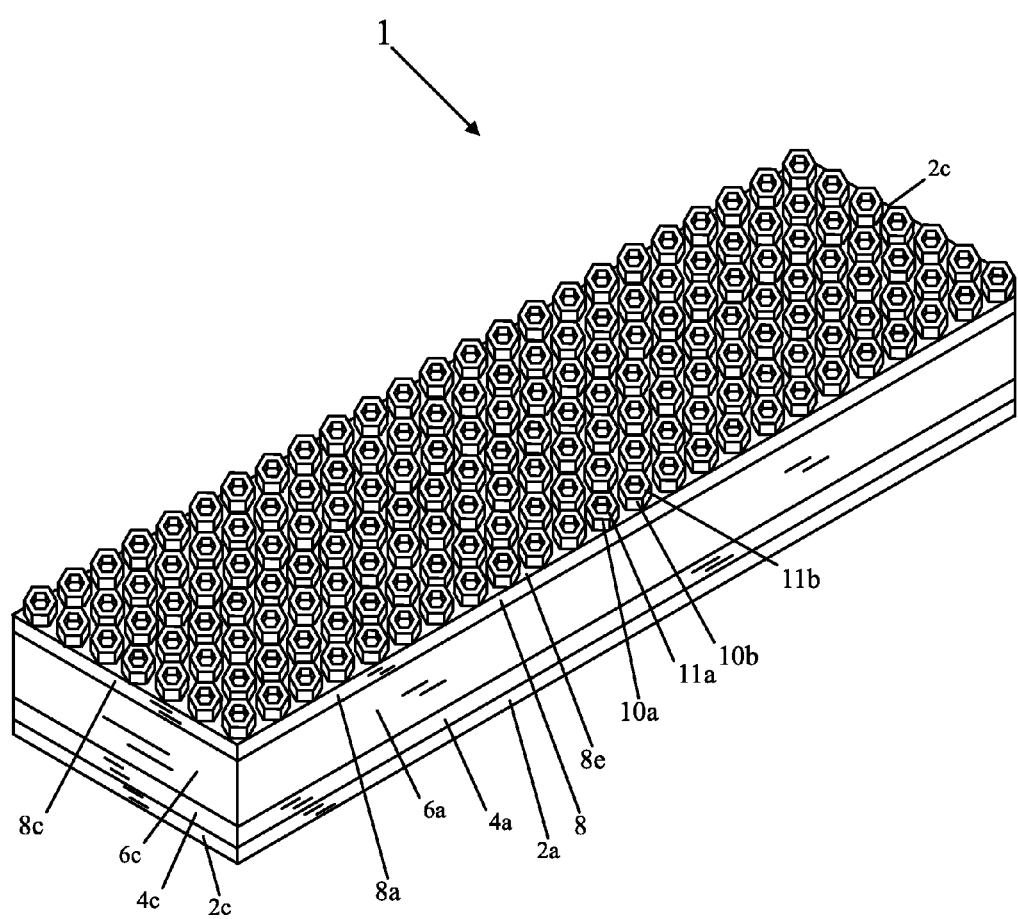
FIG. 1C shows a bottom, rear, right side perspective view of the floor plank or tile of FIG. 1A.
Figure 1D:
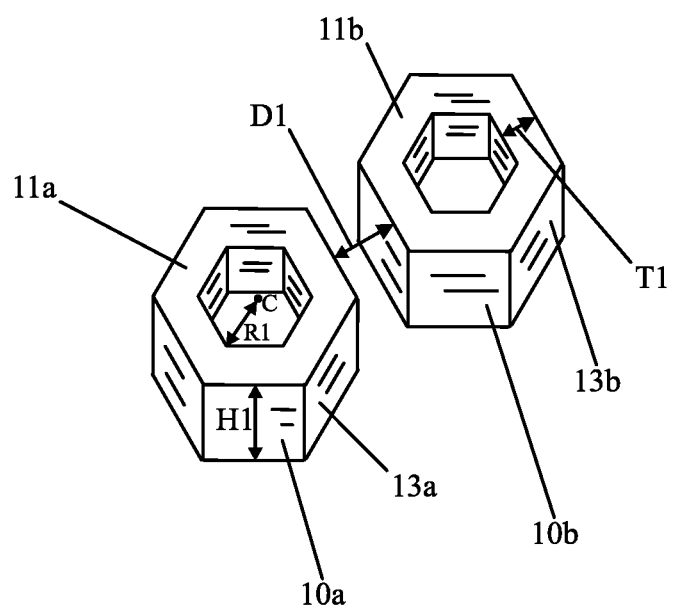
FIG. 1D shows a bottom rear right side perspective view of two protruding devices of a backing layer of the floor plank or tile of FIG. 1A.

FIG. 1A shows a top, front, right side perspective view of a floor plank or tile 1 in accordance with an embodiment of the present invention. FIG. 1B shows a top, rear, left side perspective view of the floor plank or tile 1 of FIG. 1A. FIG. 1C shows a bottom, rear, right side perspective view of the floor plank or tile 1 of FIG. 1A. FIG. 1D shows a bottom rear right side perspective view of two protruding devices 10a and 10b of a backing layer 8, of the floor plank or tile 1 of FIG. 1A.

Referring to FIGS. 1A-1D, the floor plank or tile 1 includes a wear layer 2, a pattern layer 4, a base layer 6, and a backing layer 8. The backing layer 8 includes a plurality of protruding devices or members 10, including device or member 10a and device or member 10b shown in FIGS. 1A-1C. The protruding devices or members 10 may be replaced by indentation devices or grooves, each groove or indentation device having a shape similar to members 10a or 10b.

The floor plank 1 may be considered to be a piece or may be formed from a piece in accordance with an embodiment of the present invention.

The wear layer 2 includes a right side 2a, a front 2b, a rear 2c, and a left side 2d as shown by FIGS. 1A and 1B. The pattern layer 4 includes a right side 4a, a front 4b, a rear 4c, and a left side 4d as shown by FIGS. 1A and 1B. The base layer 6 includes a right side 6a, a front 6b, a rear 6c, and a left side 6d as shown by FIGS. 1A and 1B. The backing layer 8 includes a right side 8a, a front 8b, a rear 8c, and a left side 8d as shown by FIGS. 1A and 1B.

The wear layer 2 may include any known wear layer. The wear layer 2 may be substantially made of PVC (Polyvinylchloride).

The pattern layer 4 may include any known pattern layer. The pattern layer 4 may be printed on a white-based PVC (Polyvinylchloride) film, or on the back of a transparent PVC film.

The wear layer 2 may be a thin transparent layer. The pattern (or design) layer may be a thin design layer, such as a synthetic wood grain design layer or a polyvinyl chloride (PVC) synthetic wood grain design layer or a polypropylene synthetic wood grain design layer.

In accordance with an embodiment of the present invention, the base layer 6, may include a filler made of ilmenite powder, and in another embodiment may include a filler made of ilmenite powder and calcium carbonate. The base layer 6 may be made of a mixture of filler (such as a filler comprised of ilmenite powder and calcium carbonate), PVC (polyvinyl chloride), a plasticizer, and other additives, such as a stabilizer, such as carbon black, DOA, or rosin. These may be the only components or ingredients of base layer 6.

In at least one embodiment, for a batch of material for base layer 6, a batch may be made of a mixture of fifty kilograms (kgs) of virgin PVC, seventy-five kilograms (kgs) of ilmenite powder, sixty kilograms (kgs) of calcium carbonate, 0.45 killograms (kgs) of carbon black, 0.3 kilograms (kgs) of rosin (or resin oil), 0.75 kilograms (kgs) of stabilizer, five kilograms (kgs) of DOA, and thirty-five kilograms (kgs) of DINP.

If virgin PVC is used (i.e. not recycled PVC) then the ratio of PVC to filler by weight may range from 1.0 to 1.0 at one end of a first range to 1.0 to 1.3 at the other end of the first range. I.e. at one end of the first range, for every one gram of filler there may be one gram of PVC and at the other end of the first range, for every one gram of PVC there may be 1.3 grams of filler.

If recycled PVC is used then the ratio of recycled PVC to filler by weight may range from 1.0 to 1.0 (1:1) at one end of a second range to 1.0 to 2.0 (1:2) at the other end of the second range. I.e. at one end of the second range, for every one gram of recycled PVC there may be one gram of filler and at the other end of the second range for every one gram of recycled PVC there may be two grams of filler. The filler may be substantially or entirely made of ilmenite powder. The filler may be made of ilmenite powder and calcium carbonate, or may contain little or no calcium carbonate and substantially or only ilmenite powder.

However, it should be noted that recycled PVC typically includes within it an amount of filler, wherein the filler in the recycled PVC may include calcium carbonate, however the particular type of filler in the recycled PVC depends on which industry the recycled PVC is from. However, in one or more embodiments, the content of PVC in recycled PVC is less than virgin PVC because recycled PVC may be a mix of calcium carbonate and PVC. If recycled PVC is used, the ratio of recycled PVC to calcium carbonate may be 1:0 (i.e. no calcium carbonate) at one end of a range to 1:1 at another end of a range.

For at least one embodiment of the present invention, the plank/tile 1 has to smoothly contact the underlayment or subfloor or surface 100a of FIG. 1A. Therefore, for at least one embodiment of the present invention, we may use higher contents of virgin PVC for the base layer 6, for example 1.0 to 1.0 (1:1) at one end of a third range to 1.0 to 2.5 (1:2.5) at another end of the third range. I.e. at one end of the third range, for every one gram of virgin PVC there may be 1.0 grams of filler and at the other end of the third range, for every one gram of virgin PVC there may be 2.5 grams of filler.

The filler of the base layer 6, in accordance with one embodiment of the present invention, is made of a mixture of ilmenite powder and calcium carbonate and may be made of only ilmenite powder. The ratio of ilmenite powder to calcium carbonate may be about 1.25 to 1.0 (1.25:1). I.e. for every one and a quarter grams of ilmenite powder there may be one gram of calcium carbonate. A mixture of calcium carbonate and ilmenite powder is used, for at least the reason, that calcium carbonate is less expensive than ilmenite powder. The actual formula may change subject to the quality of raw materials used for the base layer 6, the temperature of the season, and the request of customer. For example, for request of customer, the customer may want greater hardness, a different type of flexibility, or a different type of overall tile/plank thickness, and these may affect the percentages of raw materials or materials used for the base layer 6.

For the base layer 6, in at least one embodiment, all raw materials which may include filler (such as a filler comprised of ilmenite powder and calcium carbonate), PVC (polyvinyl chloride), a plasticizer, and other additives may be mixed together and heated in a mixer, such as a Banbury mixer for pre-plasticization, to form an overall mixture. A Banbury mixer as known in the art is an internal mixer produced by Farrel Corporation, used for mixing or compounding plastics and interspersing reinforcing fillers in a resin system.

After the overall mixture is formed by the mixer, such as a Banbury mixture, the overall mixture may be sent to sets of rollers or to a calendering machine to produce the base layer 6. The wear layer 2, pattern layer 4, and base layer 6 may then be laminated together with a hot press machine. The base layer 6 material may need to be cut before lamination to fit the size of the hot press machine. Some factories can also laminate by using extruder or calendering machine, they don't have to cut the base layer 6 immediately but can automatically and continuously go on producing.

It is known to make a floor plank or tile with a filler including iron powder and calcium carbonate. However, ilmenite powder is not known for use in a base layer for a floor plank or tile. Using ilmenite powder in accordance with an embodiment of the present invention for a floor plank or tile, such as floor plank or tile 1, is better than using iron powder for several reasons. Firstly, ilmenite powder is as not sensitive to temperature, as iron powder is, which means that ilmenite powder is less likely to expand and contract than iron powder, and therefore a floor plank or tile, such as floor plank or tile 1 made of a base layer including ilmenite powder is less likely to expand and contract than a floor plank or tile make of iron powder.

Secondly, ilmenite powder is better than iron powder for keeping dimensional stability of a floor plank, meaning that the floor plank or tile 1 is less likely to expand or contract with ilmenite powder used for the base layer 6 than with iron powder. Expansion or contraction of the floor plank or tile 1, after installation on a floor surface such as 100*a*, may change size (or even shape) of floor plank or tile 1, and would be a problem for end-user, reseller or installer. Generally, contraction or expansion of a floor plank or tile, even before or during installation may cause problem because not every piece will expand or shrink to a same size.

Thirdly, Ilmenite powder has anti-oxidization properties that are better than iron powder, which means that ilmenite powder is less likely to rust than iron powder (also, a rusted iron may have bad smell). Fourthly, Ilmenite powder typically costs less than iron powder. Fifthly, for a floor plank or tile, such as 1, of an embodiment of the present invention, which can be used, and is used in at least one embodiment, without applying adhesives to the bottom surface 8*e* of the backing 8 or to the outer surfaces 11*a* and 11*b* and other outer surfaces of the plurality of devices 10, it is desirable to make the floor plank or tile 1 heavier. Increasing the weight of the floor plank or tile 1, makes it more difficult for the floor plank or tile 1 to move when placed on a floor surface, such as surface 100*a* of floor 100 in FIG. 1. Ilmenite powder is heavier than iron powder, so a combination of ilmenite powder and calcium carbonate is heavier than a combination of iron powder and calcium carbonate. In at least one embodiment of the present invention, the mixing percentage of ilmenite powder and calcium carbonate can be adjusted to make a heavier plank.

In at least one embodiment of the present invention using ilmenite instead of iron, allows a plank or tile 1 to be made which uses 10% to 20% more calcium carbonate in the base layer 6 than in iron powder—calcium carbonate base layers of the prior art. With the same weight of ilmenite or iron, it is possible to put more calcium carbonate in the base layer 6, which means less PVC can be put in the base layer 6 compared with PVC in base layers of the prior art, so we can save cost and increase weight. Due to the use of ilmenite, we can use more calcium carbonate. The unit price of calcium carbonate is typically much lower than ilmenite powder, iron powder, or PVC, or most if not all of the components used in the base layer 6. In contrast, in the known prior art, floor planks or tiles are made as light as possible to keep down costs of transporting the floor planks and tiles. In the known prior art light calcium carbonate is used, whereas in at least one embodiment of the present invention "heavy" calcium carbonate is used. Typically there are two types of calcium carbonate. One is light weight or "light" calcium carbonate, which may be used for the base layer 6 of an embodiment of the present invention, and; another is heavy weight or "heavy" calcium carbonate, which is commonly used in paint or other industries. but which is typically not used for base layer 6 or for base layers of floor planks or tiles of the prior art. It is possible, that heavy weight or "heavy" calcium carbonate may be used for a base layer 6 in an alternative embodiment of the present invention.

The base layer 6, in accordance with an embodiment of the present invention also may include an additional plasticizer, which may be made of 5% DOA (Bis(2-ethylhexyl)adipate) and 95% DINP (Di-isononyl phthalate) and which may be used in PVC in the base layer 6 as a plasticizer. This particular plasticizer has low temperature resistance and may create better flexibility for the base layer 6, than using DINP (Di-isononyl phthalate) alone, which is typically done for known base layers for known planks and tiles. In at least one embodiment of the present invention, the base layer 6 may be made of PVC, ilmenite powder, calcium carbonate, DOA, a plasticizer (such as DINP, typically used in the PVC), lubricant and some other additives.

The plasticizer used for the base layer 6 may be a Flexidone plasticizer (instead of DINP) from International Specialty Products Inc., (ISP), located in Wayne, N.J., (internet address: ispplastics.com). These Flexidone plasticizers are typically based on N-alkyl pyrrolidone chemistry.

The backing layer 8 may have a bottom surface 8*e* shown in FIG. 1C. An anti-slip backing film, such as made of Polyurethane (PU), may be located on the bottom surface 8*e*. An anti-slip backing film, such as made of Polyurethane (PU), may also be located on the outer surfaces of the protrusions or devices 10, such as on the outer surfaces 11*a* and 11*b* of the devices 10*a* and 10*b*, shown in FIGS. 1C and 1D. The anti-slip backing film may be laminated on the bottom surface 8*e* and the outer surfaces 11*a* and 11*b*, and similar outer surfaces of each of the plurality of devices 10.

An anti-slip backing coating of a composition A may be located on the bottom surface 8*e*. The anti-slip backing coating of a composition A, in at least one embodiment, is preferrably a water based synthetic material having about 35% to 42% water, about 8% to 10% dipropylene glycol, about 40% to 50% polypropylene homopolymer, and about 6% to 8% n-butyly ether by weight. These percentages are critical in at least one embodiment to provide a tacky or somewhat sticky anti-slip backing coating of a composition A, which frictionally engages material or structure which is beneath the floor plank or tile 1. Anti-slip or frictionally engaging performance is derived in large part from the polypropylene homopolymer. The water in the composition A, which makes the coating of a composition A water based. This makes the coating of a composition A environmentally friendly, such that the coating of a composition A is easy to apply, process, clean, discharge and cure, such as through evaporation, and abandon, such that there is, no residue. The anti-slip backing coating of a composition A, may also be located on the outer surfaces of the protrusions or devices 10, such as on the top outer surfaces 11*a* and 11*b* of the devices 10*a* and 10*b*, shown in FIGS. 1C and 1D and/or on side outer surfaces 13*a* and 13*b*, shown in FIGS. 1C and 1D. The anti-slip backing coating of a composition A may be laminated on the bottom surface 8*e* and the top outer surfaces 11a and 11b, or side outer surfaces 13a and 13b, and similar outer surfaces of each of the plurality of devices 10.

The anti-slip backing coating of a composition A, in some embodiments, may be located only at the perimeter of the floor plank 1, for example only on the top outer surfaces, similar or identical to top outer surfaces 11a and 11b shown in FIG. 1D, of the devices of plurality of device 10 which are at the outer edges or outer sides of the floor plank 1, such as near right side 8a, front 8b, rear 8c, and left side 8d, shown in FIG. 1A. For example, in at least one embodiment, only one row of the plurality of devices 10 along the right side 8a, only one column of the plurality of devices 10 along the front 8b, only one column of the plurality of devices 10 along the rear 8c, and only one row of the plurality of devices 10 along the left side 8d may be coated with the anti-slip backing coating of a composition A.

In at least one embodiment, the side outer surfaces 13a and 13b, shown in FIG. 1D, and similar or identical side outer surfaces of the rest of the plurality of devices 10, and/or of only devices of the plurality of devices 10 near the right side 8a, front 8b, rear 8c, and left side 8d, i.e. the perimeter, may be coated with the anti-slip backing coating of a composition A. Having only devices of the plurality of devices 10, near or on the perimeter (near 8a, 8b, 8c, 8d) coated with the anti-slip coating of a composition A results in a cost savings.

In at least one embodiment, the anti-slip coating of a composition A, may be located only at the corners, such as on the top outer surfaces 11a and 11b or the side outer surfaces 13a and 13b or similar or identical surfaces of other devices of devices 10 which are near first corner or junctions of 8a and 8b, second corner or junction of 8a and 8c, third corner or junction of 8c and 8d, and fourth corner or junction of 8b and 8d.

The right side 8a, front 8b, rear 8c, and left side 8d, are previously referred to above for reference, for location of the appropriate devices of devices 10, however typically the anti-slip coating of a composition A, typically does not actually touch 8a-d, since the anti-slip coating of a composition A doesn't have to contact, and typically does not contact an adjacent piece of tile or floor plank, similar or identical to floor plank 1.

In at least one embodiment of the present invention an, in order to form the plank or tile 1 of FIGS. 1A-C, an anti-slip PU film may be placed between the base layer 6 and an embossing plate for (lamination all components together and create honeycomb texture) a honeycomb design (i.e. the configuration of hexagonal shapes shown in FIG. 1C) In such an embodiment, the anti-slip PU film may cover outer surfaces 11a and 11b and other outer surfaces of the devices 10 shown in FIG. 1C, and the anti-slip PU film may come between the base layer 6 and the backing layer 8. In such an embodiment, the anti-slip film may entirely surround the backing layer 8 and the devices 10. The backing layer 8 and the devices 10, surrounded by an anti-slip film may be sent to a hot press machine with the base layer 6 to laminate the backing layer 8 onto the base layer 6, with the anti-slip film between the base layer 6 and the backing layer 8 and surrounding the devices 10. The anti-slip film may be considered to be integrated with the backing layer 8, i.e. part of the backing layer 8. The honeycomb texture, for example in FIG. 1C, the devices 10 shown protruding from the backing layer 8, may be created through heat. In at least one embodiment, the anti-slip film thus covers every part of the honeycomb.

It is known in the art to place PVC film on a bottom surface of a floor plank or tile, in order to keep the floor plank or tile flat, to prevent cupping or pillow-up, and also to isolate moisture from an underlayment or subfloor. However, PVC film was not typically used to provide an adhesive free anti-slip surface. It is known in the art to use PU (polyurethane) on the top surface of a floor plank or tile, for the purpose of durability and easy cleaning.

In at least one embodiment of the present invention, PU (polyurethane) is better than PVC for use as an anti-slip film to surround the backing layer 8 and the devices 10, because PU is more environmentally friendly and is better at preventing moisture buildup. In at least one embodiment a PU anti-slip film surrounding the backing layer 8 and the devices 10 isolates moisture coming from the underlayment or subfloor, under a floor plank or tile, such as under floor plank or tile 1 of FIGS. 1A-C, and thereby prevents moisture from seeping into the base layer 6. If moisture is allowed to seep into the base layer 6, it may be absorbed by the calcium carbonate and may harm the quality of the floor plank or tile 1.

Instead of PU, the anti-slip backing film placed on the bottom surface 8e and on the outer surfaces of each device or devices 10, such as outer surfaces 11a and 11b, may be an aluminum oxide infused Polyurethane, a synthetic rubber, a plastic, or a material embedded with carborundum, however PU anti-slip film is preferred particularly in combination with ilmenite powder filler for the base layer 6 and honeycomb bottom texture or devices 10 for the backing layer 8. However, for other types of base layers or backing layers, other types of anti-slip backing films may be better. For example, for rubber floor base layers or replace all of layers 2, 4, and 6 with rubber (to rubber tile, base layer 6 typically has to be rubber or rubber synthetics0. Layer 2 & 4 can still be PVC or other plastic synthetics. A rubber floor sometimes does need layers, similar to layers 2 and 4. A rubber floor can be solid-colored or simply spread pigment in solid-colored base to create random pattern, by for example spreading colorful chips through the rubber material. Synthetic rubber for an anti-slip film may be better than PU, in one or more embodiments.

Each of the plurality of devices 10 may have the same, or substantially the same, hexagonal, six sided shape, as shown by FIGS. 1C and 1D. The plurality of devices 10 may be arranged in a honeycomb configuration as shown by FIG. 1C. As shown in FIG. 1D there may be a distance of D1 between devices 10a and 10b. Similarly there may be a distance of D1 between each of the plurality of devices 10 and any adjacent device of the plurality of devices 10. Each of the plurality of devices 10 may have a height H1 which may be 0.1 mm (millimeters) to 0.3 mm (millimeters). Each of the plurality of devices 10 may have six walls making up the hexagonal shape, and the thickness T1 of each of the walls of each of the devices 10 may be in a range of 0.30 millimeters (mm) to 1.0 millimeters (mm), or wider or narrower in some cases. For at least one embodiment of the present application, about 0.35 millimeters are used for the thickness T1, in a range of plus or minus +/−0.05 millimeters. The hexagonal shape may be delineated by a regular hexagon having a center C and a radius R1 as shown in FIG. 1D, which may be about 3.0 mm (millimeters) to 5.0 mm (millimeters). D1 may be zero because hexagonal shapes may be connected together. However, D1 may be some non-zero value, such that there is separation between adjacent hexagonal structures, such as between device 10a and 10b in FIG. 1D. It is known in the art to have circles or circular protrusions on the bottom of a floor plank or tile. However the hexagonal shape of each of devices 10 and the honeycomb configuration of an embodiment of the present invention, as shown in FIG. 1C, have been found to have better anti-slip performance, than the known configuration of circles. The outer surfaces 11a and 11b (shown in FIG.

1D) and similar outer surfaces of each of the plurality of devices 10, help the floor plank or tile 1 to frictionally contact a top floor surface of a floor, such as a top floor surface 100*a* of a floor 100, shown in dashed lines in FIG. 1A. In FIG. 1A, the outer surfaces of the devices 10, such as outer surfaces 11*a* and 11*b*, shown in FIG. 1C, and similar outer surfaces, contact the top surface 100*a* of the floor 100. As previously described there may be an anti-slip film on the outer surfaces 11*a* and 11*b*, such that the anti-slip film actually comes in contact with the top surface 100*a* of the floor 100.

Typically a cutting die would be used to form the edges of the floor plank or tile 1, such as edges at the front 2*b*, right side 2*a*, rear 2*c*, and left side 2*d*, shown in FIG. 1B. The floor plank 1 may be in the form of a conventional known plank or tile The base layer 6 may be made in advance by calendering (sophisticated, base layer will be thin) or by sets of rollers (simple, base layer will be thicker). The wear layer 2, pattern layer 4 and base layer 6 may then be properly aligned, so that each layer has substantially the same length and width, is aligned with the other layers, and does not extend substantially beyond the other layers. After cutting, the aligned layers 2, 4, and 6 may then be sent to a hot press machine for lamination to add the backing layer 8 and the devices 10.

A cutting die can be installed with a calendering machine or extrusion machine, so the entire production process may be made to be automatic and continuous. But due to technique bottleneck or budget limit, factory can also cut lamination sheet into slab, then send to independent, or standoff, cutting die to shape into piece or floor plank or tile 1.

The wear layer 2 is transparent, and typically has a thickness of from 0.03 millimeters to 1.2 millimeters. The base layer 6, can itself be comprised of more than one layer, such as one, two, or three layers, typically depending on the thickness T2 of the plank or tile 1, shown in FIG. 1B. Although the base layer 6 may be comprised of more than one layer, it will still appear to be one layer, because any multiple layers of the base layer 6 will be laminated together, unless the layers are different colors.

The wear layer of the layer 4 of the plank, tile or piece 1, may be pure PVC, with greater pulling power (upward) when temperature goes down (for example, a relatively higher processing temperature versus relatively lower room temperature), and for such a PVC wear layer, typically a balance layer as part of the base layer 6 of the plank, tile or piece 1 is used to offset the pulling power of the wear layer 4. A leveling layer or in this case the devices 10 (and anti-slip surface) of the base layer 6 of the floor plank or tile 1, would be the bottommost layer and is placed in contact with a subfloor or underlayment surface 100*a* of subfloor 100, shown by dashed lines in FIG. 1A.

A fiber glass layer may optionally be placed between the pattern film layer 4 at the bottom and the base layer 6 (or may be placed between a leveling layer and balance leveler), however alternatively, fiber glass materials can be mixed in with the base layer 6 of the floor plank 1. Fiber glass materials mixed in with the base layer 6.

For the lowest (price wise) end product for residential uses, a pattern may be printed on the back of the wear layer 2, then a pure white film may be paved underneath the pattern (on the non-pattern side) layer 4, which is called a "feature layer/film". The combination wear layer 2 (with pattern on back) and "feature layer/film" may then be laminated onto a base layer 6, and thereafter a large slab or sheet including the combination wear layer 2 and the base layer 6 may be die cut to form a plurality of pieces each identical or similar to piece or floor plank 1. For better anti-scratch, anti-cuff and better durability of the surface or top 2*e* shown in FIG. 1A, a coating may be spread on top of the surface or top 2*e*, such as a polyurethane coating. A coating of silicone, Teflon, or epoxy and other types of coatings may also be used on the surface 2*e*.

On the back of the floor plank or tile such as on outer surfaces 11*a* and 11*b* shown in FIG. 10, there is typically a need to provide protection from moisture from the subfloor or underlayment 100 under the tile/plank 1.

The base layer 6, following cutting away portions of a raw material piece to form the plank 1 may be comprised of one or more of the following materials: polyvinyl chloride (PVC), calcium carbonate (filler), DOP or DINP, a lubricant, a stabilizer, and/or various additives. DOP (Dioctyl Phthalate) is a combustible non-toxic colorless oily liquid with slight odor. Disononyl phthalate (DINP) has similar functions and properties as DOP but is more environmental-friendly. The lubricant may be resin oil or rosin. The wear layer 2, the pattern film layer 4, and the base layer 6 may be laminated to each other through heat (can also be laminated by adhesive or cement). The plank 1 of FIGS. 1A-D, may be initially formed by being die cut from a raw material piece. However, in accordance with an embodiment of the present invention a raw material piece is not die cut in order to modify a raw material piece into the plank 1.

Instead of die cutting to initially form a raw material piece, another method such as water jet, and CNC, Computer numerical control, which utilizes the commands of numerical control program (compiled by computer) to drive a motor of machine can be used.

In at least one embodiment, an anti-slip backing film such as polyvinyl chloride is used together with an anti-slip backing coating, such as of the composition A previously described, on the bottom surface of the backing, such as on surfaces 11*a* and 11*b* of devices 10*a* and 10*b* shown in FIG. 1D, and on similar or identical surfaces of similar or identical devices of the plurality of devices 10 shown in FIG. 1C. In other embodiments, the anti-slip coating of a composition A may be used on the devices 10 without the anti-slip backing film. In other embodiments, the anti-slip coating of a composition A may be used only on some of the devices 10, such as for example only on the perimeter of the plank 1, such as on devices of devices 10 which are near right side 8*a*, front 8*b*, rear 8*c*, and left side 8*d*. For example, one row of devices 10 adjacent right side 8*a*, one column of devices 10 adjacent front 8*b*, one column of devices 10 adjacent rear 8*c*, and one row of devices 10 adjacent left side 8*d*, may have anti-slip coating of a composition A, placed on outer surfaces, similar or identical to outer surfaces 11*a* and 11*b*, shown in FIG. 1D. Anti-slip coating of a composition A, in other embodiments, may only be placed on outer surfaces, similar or identical to 11*a* and 11*b*, in corners of the plank 1 in FIG. 1A, such as near junctions 8*a*-8*c*, 8*b*-*d*, 8*c*-8*d*, and 8*a*-8*b*. The combination of the weight of the plank 1, which is effected by the amount of ilmenite powder and the amount of anti-slip coating or film helps the plank 1 to remain stationary, i.e. not to slip with respect to an underlying subfloor surface. The use of the anti-slip coating, particularly of a composition A, allows the overall thickness, T2 shown in FIG. 1B, of the plank 1 to be reduced, such as from four millimeters to three millimeters in at least one embodiment, or even two and one half millimeters or two millimeters in another embodiment, which results in a costs savings.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a piece for flooring comprised of
  a wear layer,
  a pattern layer,
  a base layer, and
  and a backing layer;
and wherein the base layer is made of a mixture comprised of ilmenite powder;
wherein the backing layer has a bottom surface including anti-slip backing coating;
wherein the anti-slip backing coating is a water based synthetic material including water, dipropylene glycol, polypropylene homopolymer, and n-butyly ether.

2. The apparatus of claim 1 wherein
the percentage of water by weight in the anti-slip backing coating is about thirty-five to forty-two percent, the percentage of dipropylene glycol by weight in the anti-slip backing coating is about eight to ten percent, the percentage of polypropylene homopolymer by weight in the anti-slip backing coating is about forty to fifty percent, and the percentage of n-butyl ether by weight in the anti-slip backing coating is about six to eight percent.

3. The apparatus of claim 1 wherein
about one third of the mixture is ilmenite powder.

4. The apparatus of claim 1 wherein
the mixture is comprised of calcium carbonate.

5. The apparatus of claim 3 wherein
the mixture is comprised of calcium carbonate; and
wherein about one quarter of the mixture is calcium carbonate.

6. The apparatus of claim 1 wherein
the mixture is comprised of polyvinylchloride.

7. The apparatus of claim 5 wherein
the mixture is comprised of polyvinylchloride; and
wherein about one quarter of the mixture is polyvinylchloride.

8. The apparatus of claim 1 wherein
the backing layer includes a plurality of devices which are hexagonally shaped, and wherein the plurality of devices form a honeycomb structure which contacts a top floor surface when the piece is placed on the top floor surface.

9. The apparatus of claim 8
wherein the bottom surface of the backing layer includes anti-slip backing film; and
wherein the anti-slip backing film is comprised of polyvinyl chloride.

10. A method comprising
placing a plurality of pieces for flooring on a subfloor to form a floor;
wherein each of the plurality of pieces is comprised of:
  a wear layer,
  a pattern layer,
  a base layer, and
  and a backing layer;
and wherein the base layer is made of a mixture comprised of ilmenite powder;
wherein the backing layer has a bottom surface including anti-slip backing coating;
wherein the anti-slip backing coating is a water based synthetic material including water, dipropylene glycol, polypropylene homopolymer, and n-butyly ether.

11. The method of claim 10
the percentage of water by weight in the anti-slip backing coating is about thirty-five to forty-two percent, the percentage of dipropylene glycol by weight in the anti-slip backing coating is about eight to ten percent, the percentage of polypropylene homopolymer by weight in the anti-slip backing coating is about forty to fifty percent, and the percentage of n-butyl ether by weight in the anti-slip backing coating is about six to eight percent.

12. The method of claim 10 wherein
each of the plurality of pieces of flooring is placed on the subfloor without applying an adhesive to adhere the plurality of pieces to the subfloor.

13. The method of claim 10 wherein
about one third of the mixture is ilmenite powder.

14. The method of claim 10 wherein
the mixture is comprised of calcium carbonate.

15. The method of claim 13 wherein
the mixture is comprised of calcium carbonate; and
wherein about one quarter of the mixture is calcium carbonate.

16. The method of claim 10 wherein
the mixture is comprised of polyvinylchloride.

17. The method of claim 15 wherein
the mixture is comprised of polyvinylchloride; and
wherein about one quarter of the mixture is polyvinylchloride.

18. The method of claim 10 wherein
the backing layer includes a plurality of devices which are hexagonally shaped, and wherein the plurality of devices form a honeycomb structure which contacts a top floor surface when the piece is placed on the top floor surface.

19. The method of claim 10
wherein the bottom surface of the backing layer includes an anti-slip backing film;
wherein the anti-slip backing film is comprised of polyvinyl chloride.

* * * * *